US007058801B2

(12) United States Patent
Yakovlev

(10) Patent No.: US 7,058,801 B2
(45) Date of Patent: ***Jun. 6, 2006

(54) METHODS AND COMPUTER SYSTEMS FOR UPDATING VALUES OF A DSDT

(75) Inventor: Sergiy B. Yakovlev, Duluth, GA (US)

(73) Assignee: American Megatrends, Inc., Norcross, GA (US)

( * ) Notice: Subject to any disclaimer, the term of this patent is extended or adjusted under 35 U.S.C. 154(b) by 524 days.

This patent is subject to a terminal disclaimer.

(21) Appl. No.: 10/369,871

(22) Filed: Feb. 19, 2003

(65) Prior Publication Data

US 2004/0162975 A1   Aug. 19, 2004

(51) Int. Cl.
*G06F 9/445* (2006.01)
(52) U.S. Cl. .............. 713/100; 713/1; 713/2; 713/100; 710/15; 710/65; 719/321; 719/328; 719/331; 719/332
(58) Field of Classification Search ............ 713/1, 713/2, 100; 710/15, 65; 719/321, 328, 3
See application file for complete search history.

(56) References Cited

U.S. PATENT DOCUMENTS

| | | | | |
|---|---|---|---|---|
| 5,778,226 A | * | 7/1998 | Adams et al. ............. | 719/311 |
| 6,009,480 A | * | 12/1999 | Pleso ......................... | 710/8 |
| 6,081,850 A | * | 6/2000 | Garney ....................... | 710/15 |
| 6,189,050 B1 | * | 2/2001 | Sakarda ..................... | 710/18 |
| 6,505,258 B1 | * | 1/2003 | Sakarda et al. ............. | 710/18 |
| 6,567,864 B1 | * | 5/2003 | Klein ......................... | 710/10 |
| 6,748,461 B1 | * | 6/2004 | Oshins et al. ................ | 710/8 |
| 6,772,330 B1 | * | 8/2004 | Merkin ....................... | 713/2 |
| 6,792,520 B1 | * | 9/2004 | Qureshi et al. ............. | 711/170 |
| 6,877,018 B1 | * | 4/2005 | Oshins et al. ............... | 707/206 |
| 2003/0041271 A1 | * | 2/2003 | Nalawadi et al. .......... | 713/300 |
| 2004/0030875 A1 | * | 2/2004 | Qureshi et al. ............. | 713/1 |

* cited by examiner

*Primary Examiner*—Lynne H. Browne
*Assistant Examiner*—Nitin C. Patel
(74) *Attorney, Agent, or Firm*—Hope Baldauff Hartman, LLC

(57) ABSTRACT

Methods and computer systems provide updating of device configuration information in a DSDT of a BIOS for a computer system. Because the device configuration information can be changed, this information is determined upon boot-up of the computer system. The determined device configuration information such as the device number, function number, and/or bus number is then updated in the DSDT table at an appropriate entry for the device rather than having the device configuration information be pre-defined when the DSDT is developed.

34 Claims, 4 Drawing Sheets

METHODS AND COMPUTER SYSTEMS FOR UPDATING VALUES OF A DSDT

TECHNICAL FIELD

The present invention is related to computer system configuration. More particularly, the present invention is related to updating a Differentiated System Description Table ("DSDT"), such as that defined by the Advanced Control and Power Interface ("ACPI") v. 2.0 specification, with system specific values that are appropriate for a current set of hardware of a computer system.

BACKGROUND

Computer systems have a firmware Basic Input/Output System ("BIOS") to initialize the hardware and interface the hardware with the Operating System software. Although certain Operating Systems utilize drivers for standard devices as the interface to the hardware, certain hardware devices of the computer such as the north bridge devices are not interfaced to the software through device drivers. The north bridge is a chipset of hardware that interfaces one or more processing units and system memory on one side and the peripheral subsystem on the other. This hardware is non-standard equipment of the computer system and does not follow industry specifications of such devices. The BIOS continues to handle the interfacing of these devices to the operating system.

To provide this interface to these devices not otherwise handled by a device driver, the BIOS conventionally contains a DSDT that provides at least some of the descriptions necessary to interface these devices to the software. The DSDT applies to a particular configuration of north bridge devices for the computer system, and the DSDT is a binary file that is generated during manufacturing of the BIOS for a known computer system configuration. Upon boot-up of the computer system, a pointer to the DSDT is included in a root system description table ("RSDT"), which the operating system references to find the DSDT and learn the configuration of the system.

For certain computer systems such as high capacity computer servers, the north bridge may have many configurations which can be changed by a user or by a malfunction of a device of the north bridge. For example, the Intel® i870 north bridge chipset provides up to two Scalability Port Switches ("SPS") where each SPS links up to two Scalability Node Controllers ("SNC") to a Server Input/Output Hub ("SIOH"). Each SNC can support up to four microprocessors and part of system memory.

Each of these chipset component devices has configuration information that must be known by the BIOS so that the operating system can make use of these devices. For example, the chipset component's device number, function number(s), and the chipset PCI bus number must be contained in the DSDT to allow the operating system to make use of the north bridge components. However, in some chipsets the user may change the configuration information of the computer system such as the chipset device number for these devices of the north bridge.

During manufacturing of the BIOS where the binary file forming the DSDT is created, the permutations of configuration information changes that may be made by the user for a flexible north bridge chipset cannot be predetermined. However, the DSDT must contain the proper configuration information such as the chipset device number for the device to function properly in the computer system. Thus, if the user specifies a change to the configuration information for the device, the computer system may then function incorrectly due to the resulting inaccuracy of the DSDT.

SUMMARY

Embodiments of the present invention address these and other problems by providing updating of configuration information values for the DSDT that are vital for proper functioning of a computer system through discovery of such values. Updating configuration information values in the DSDT allows the DSDT to be adapted for the current configuration information of the computer system.

One embodiment is a method of updating a DSDT of a computer BIOS. The method involves detecting a set of devices of the computer. For each device within the detected set, device configuration information is detected from querying a store of the device. For each device, a corresponding entry is found within the DSDT and the determined device configuration information is written into the corresponding entry.

Another embodiment is a method for updating a DSDT of a computer BIOS. The method involves, upon a first boot-up, analyzing hardware of the computer to find device configuration information. The DSDT is then updated with the device configuration information. Then the device configuration information of the computer is altered. Upon a re-start after altering the device configuration information, the hardware of the computer is analyzed to find the altered device configuration information, and the DSDT is updated with the altered device configuration information.

Another embodiment is a computer system including a memory storing a DSDT, a set of devices, and a BIOS. The BIOS is configured to detect the set of devices of the computer and for each device within the detected set, determine device configuration information from querying a store of the device. For each device, the BIOS finds a corresponding entry within the DSDT and writes the determined device configuration information into the corresponding entry.

Another embodiment is a computer system that includes a memory storing a DSDT, a set of devices, and a BIOS. The BIOS is configured to, upon a first boot-up, analyze hardware of the computer system to find device configuration information, and the BIOS updates the DSDT with the device configuration information. Upon a re-start after the device configuration information has been altered, the BIOS analyzes the hardware of the computer system to find the altered device configuration information and update the DSDT with the altered device configuration information.

DETAILED DESCRIPTION

Embodiments of the present invention allow the BIOS to provide an appropriate DSDT for use by the operating system so that the hardware described by the DSDT allows the operating system to utilize the hardware resources. Generally, the DSDT provides a description for computer system devices including the north bridge components that link the microprocessor(s) and memory to the south bridge where input/output devices such as a standard PCI bus bridge or any other Industry Standard bridges like LPC, ISA, or SCSI. The north bridge components and their relationship to one another are shown in FIG. 1 for a computer system.

Figure 1:
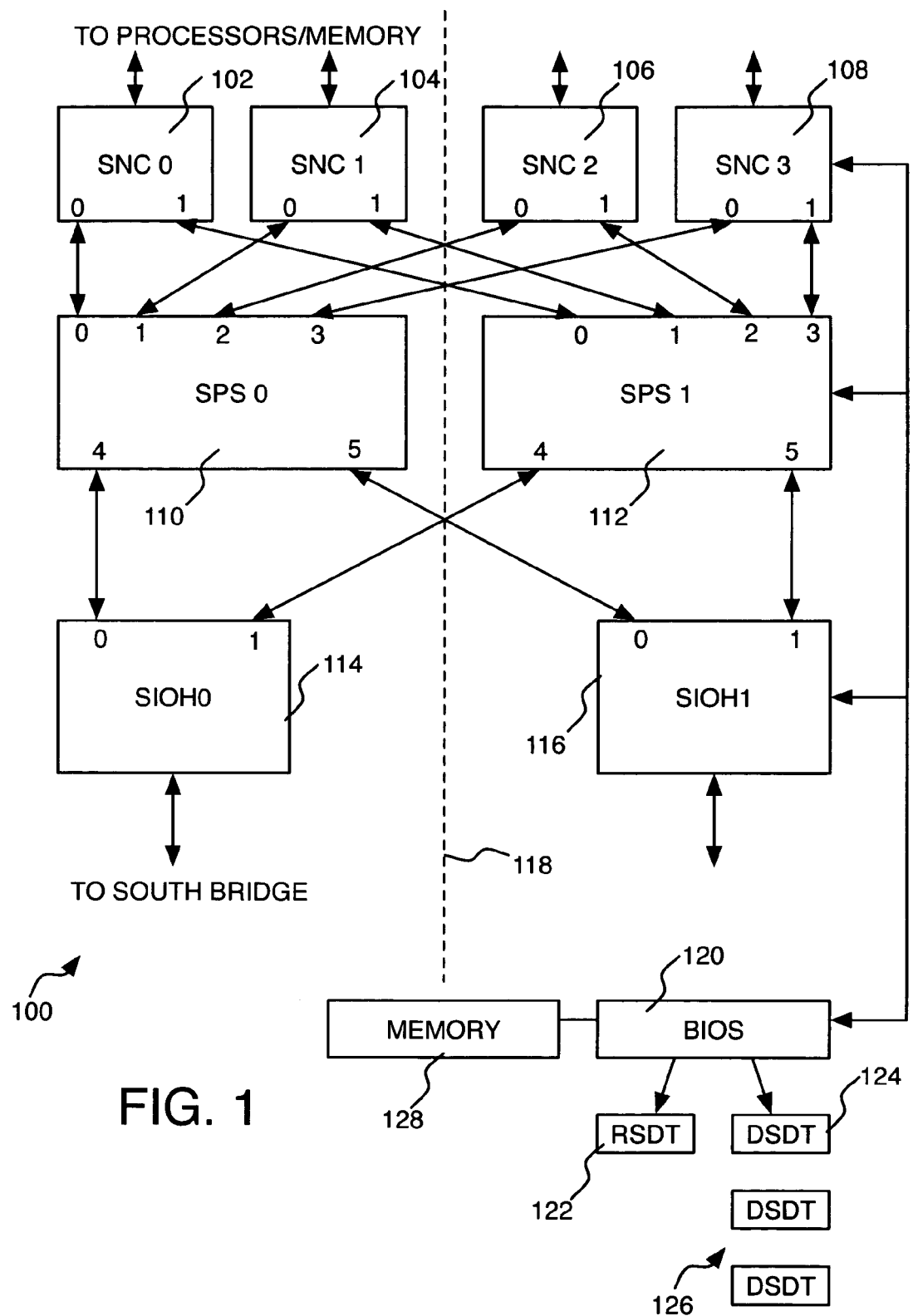
FIG. 1 shows a maximum north bridge chipset configuration and BIOS of a computer system according to one embodiment of the present invention.

The north bridge 100 of FIG. 1 shows a maximum configuration for an Intel® i870 chipset for the north bridge. The maximum configuration provides four SNCs, two SPSs, and two SIOHs. Each SNC provides channeling to up to four microprocessors and associated memory. Each SPS provides data traffic between SNCs and two SIOHs. The devices of this chipset provide up to seven functions on the PCI bus where the functions are pre-defined in the chipset manufacturer's internal design specification by a function number. For example, function 00 for an SNC of the i870 chipset corresponds to central processor unit ("CPU") interface control registers while function 01 corresponds to Scalability Port SP interface control registers.

For the maximum configuration shown, all hardware components are included and no partition has been created. A Scalability Port ("SP") 0 of a first SNC 102 is linked to an SP 0 of a first SPS 110. An SP 1 of the first SNC 102 is linked to an SP 0 of a second SPS 112. This scheme of linking one SNC SP to an available SP of the SPS 110 and another SP of the SNC to an available SP of the SPS 112 continues for the other three including SNC 104, SNC 106, and SNC 108. An SP 4 of the SPS 110 is linked to an SP 0 of the SIOH 114 while an SP 5 of the SPS 110 is linked to an SP 0 of the SIOH 116. This scheme is repeated for the other SPS 112.

The SPS 110 and 112 store logical mappings so that each SPS can provide channels between Scalability Ports of the SNCs and Scalability Ports of the SIOH. The routing by the SPS is done so that the processor(s) and memory of the SNCs can be linked to the south bridge as necessary. For example, SPS 110 is responsible for channeling port 0 of each SNC to port 0 of each of the two SIOH devices while SPS 112 is responsible for channeling port 1 of each SNC to port 1 of each of the two SIOH devices.

A system administrator may choose to divide the computer system into two separate sections so that the single computer system can function as two independent computer systems. To do so, a physical partition 118 is created by programmatically eliminating links SNC0->1, SNC1->1, SNC2->0, SNC3->0, SIOH0->1, and SIOH1->0. Due to this partition 118, SPS 110 begins to channel the SPs of the SNC 102 and the SNC 104 only to the SPs of the SIOH 114 while the SPS 112 begins to channel the SPs of the SNC 106 and SNC 108 only to the SPs of the SIOH 116. So the system becomes two independent systems and that could be running two instances of the Operating System. When this occurs, the Operating System for one of the partitions must recognize that the mapping for SPS 110 no longer accesses the SNC 106, SNC 108, and SIOH 116. Likewise, the Operating System for the other partition must recognize that the mapping for SPS 112 no longer accesses the SNC 102, SNC 104, and SIOH 114.

To allow the operating system to recognize this change, the BIOS 120 must provide the operating system with a description of this configuration. This description is included in a DSDT 124 that will be stored by the BIOS 120 in system memory. Typically, the operating system accesses the DSDT 124 that has been stored in memory by the BIOS 120 by referencing an Root System Description Table ("RSDT") 122. A pointer to the RSDT stored in the BIOS Runtime Image 120 at a predefined memory location known to the operating system. The RSDT 122 provides a pointer to the random access memory ("RAM") location 128 of the computer where the appropriate DSDT 124 has been stored by the BIOS 120. This is the ACPI reclaimable memory that the Operating System does not use for other purposes.

For embodiments where multiple DSDTs are stored by the BIOS 120 so that multiple system hardware configurations can be handled, such as partitions or malfunctioning hardware in the north bridge, the BIOS determines which DSDT of the group 126 of multiple DSDTs to point the Operating System to based on the available hardware that is detected at boot-up or re-start by operation of the BIOS 120. Thus, the pointer in the RSDT 122 may change to point to a new DSDT 124 of the group 126 that has been copied to memory 128 when the configuration of devices changes.

Figure 2:
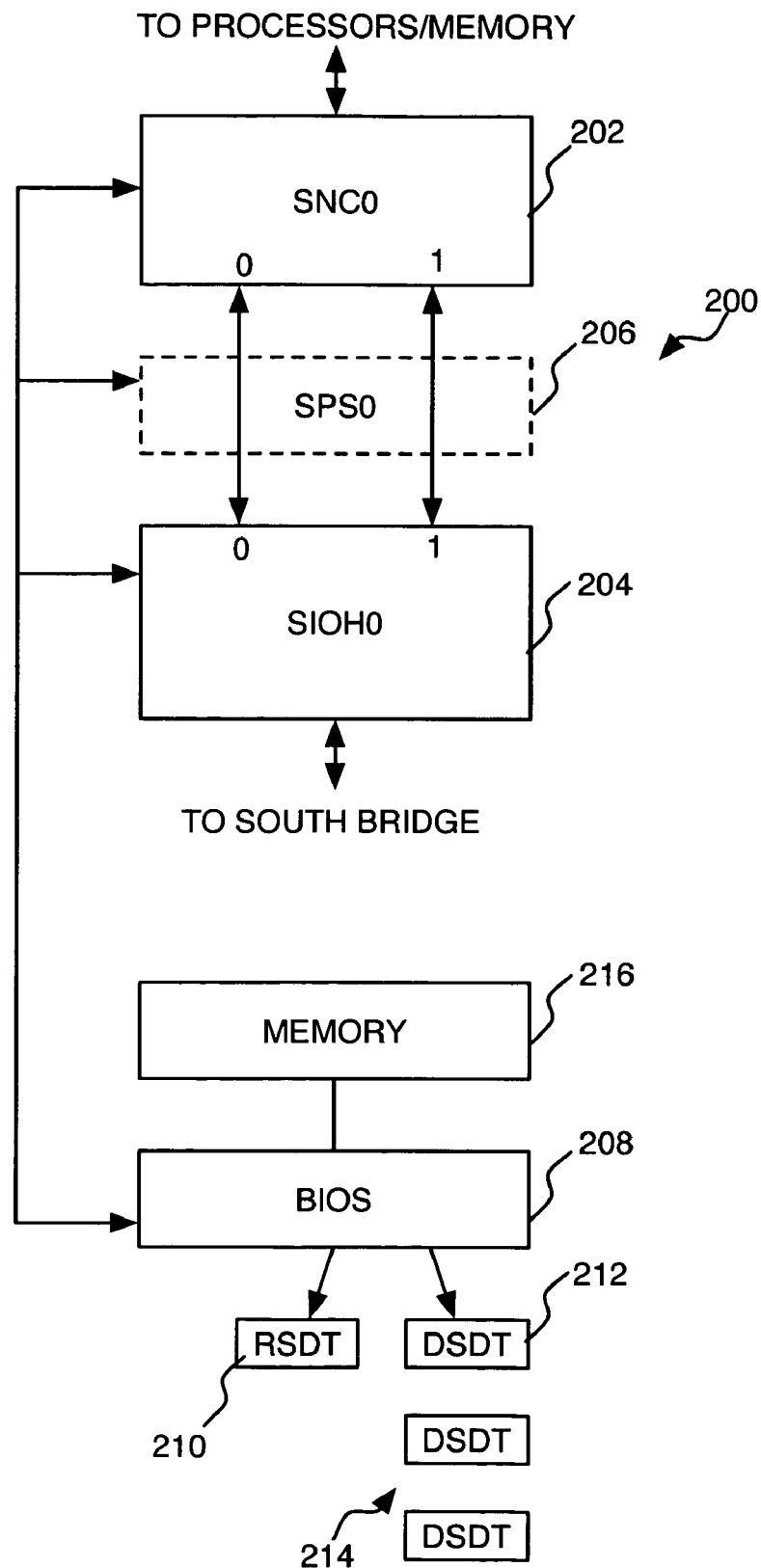
FIG. 2 shows a minimum north bridge chipset configuration of the computer system of FIG. 1 resulting from a malfunction or reconfiguration of hardware.

FIG. 2 shows an example of a different north bridge configuration 200 for a computer system. In this north bridge configuration 200, an SNC 202 is hardwired to an SIOH 204. This may be the case where the SPS 206 has failed such that an internal failure mechanism of the SPS 206 has hardwired default SPs of the SNC 202 to SPs of the SIOH 204. Alternatively, the SPS 206 may not be present in a particular configuration such that the SPs of the SNC 202 and SIOH 204 are connected together such as for the Intel Single Node 4 CPU system known as Tiger 4.

The north bridge configuration 100 of FIG. 1 may be partitioned, and then subsequently, the SPS 110 fails resulting in the configuration 200 of FIG. 2 where only a single SNC 202 remains functional and becomes hardwired to the SIOH 204. In this situation, upon boot-up or re-start of the computer system the BIOS 208 detects that no SPS is available and only the single SNC 202 is functionally linked to the SIOH 204. Upon detecting this drastic change in the system configuration, the BIOS 208 selects a different DSDT 212 to be copied into computer memory 216 from the group 214 of multiple DSDTs than was previously used. The BIOS 208 places a pointer in the RSDT 210 to provide the Operating System access to the memory 216 containing a copy of the proper DSDT 212 so that the Operating System is able to boot.

Figure 3:
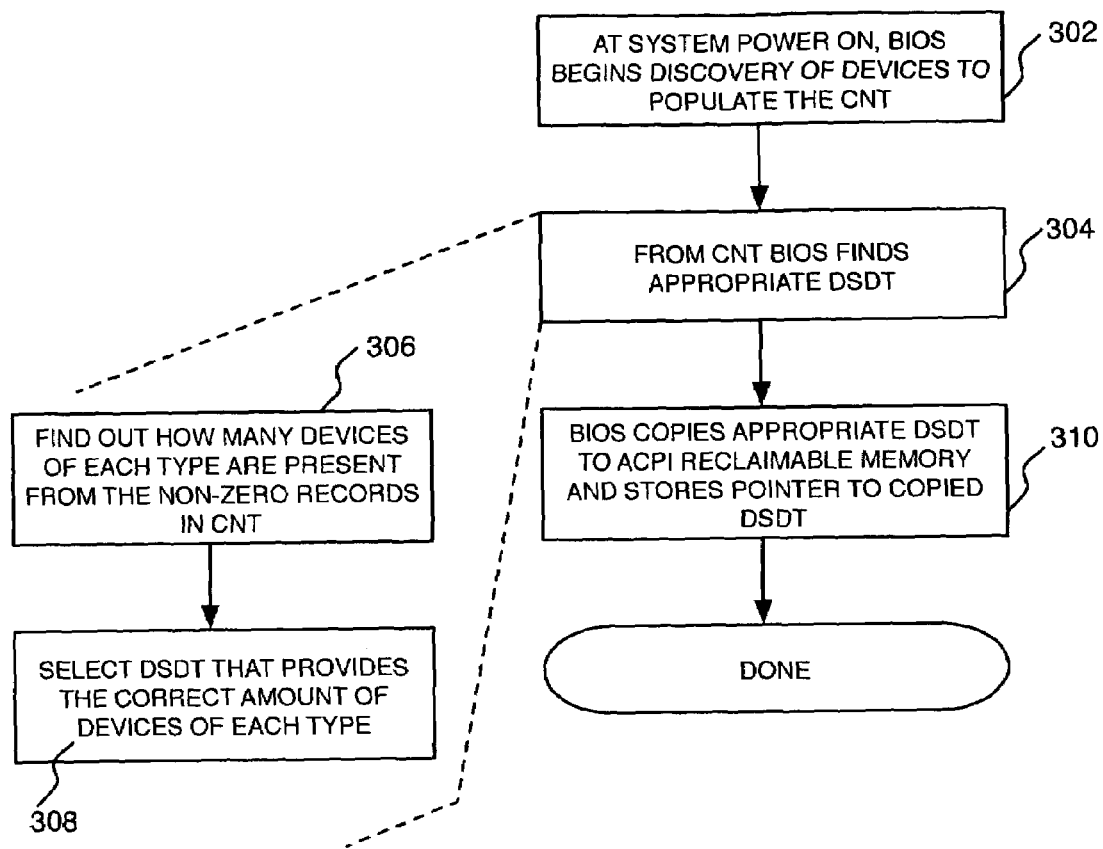
FIG. 3 illustrates the logical operations performed by the BIOS of the computer system of FIG. 1 for embodiments where an appropriate DSDT is selected for the current computer system configuration.

FIG. 3 shows illustrative logical operations performed by a BIOS according to one embodiment to select the appropriate DSDT for the current system configuration. The logical operations begin by the BIOS discovering the hardware devices of the computer system, including each available device of the north bridge, at discovery operation 302. During discovery operation 302, the BIOS populates a Chipset Node Table ("CNT") built in the system memory with information including the hardware devices being detected.

The BIOS detects chipset device components by reading a memory mapped register of the default SNC (the one that has the bootstrap CPU) to determine the SNC position (bus number and device number) on the chipset PCI bus. Upon finding the location, the BIOS proceeds to read chipset boot configuration registers of this SNC to check which devices are connected to its SPs. Moving from one discovered chipset component device to another, the BIOS uses predefined hardware specific characteristics of each chipset component to distinguish one chipset component device from another. After discovering any of the chipset component devices, the BIOS makes a record in the CNT that is initially filled by zeros.

An example of a CNT that is built in system memory is shown below in Table 1 for an illustrative system configuration. When the CNT is prepared, it is provided with a size capable of showing all information for a system with a maximum configuration. If the analysis of the system by the BIOS at boot-up discovers that the configuration is less than the maximum, then where devices are not present the information in the table has a zero value for that device. In this example, the bus number may have been discovered from the device, or alternatively may have been a pre-defined number where the bus number is hardwired and not changeable.

TABLE 1

Illustrative Chipset Node Table

| Device ID | Bus Number | Device number |
| --- | --- | --- |
| 0x0530 (an SPS) | 0xff | 0x1d |
| 0x0530 (an SPS) | 0xff | 0x1f |
| 0x0500 (an SNC) | 0xff | 0x18 |
| 0x0500 (an SNC) | 0xff | 0x19 |
| 0x0000 (device not present) | 0x00 (device not present) | 0x00 (device not present) |
| 0x0000 (device not present) | 0x00 (device not present) | 0x00 (device not present) |
| 0x0510 (an SIOH) | 0xff | 0x1c |
| 0x0510 (an SIOH) | 0xff | 0x1e |

As shown in this example, the discovery operation 302 has produced a CNT that indicates that two SPS exist in the system and two of the four possible SNC exist in the system such that each SPS supports an SP of the SNCs. Additionally, two SIOH exist in the system. Once this table has been populated, the BIOS searches through the sequence of DSDTs that it stores at DSDT selection operation 304 to find the appropriate DSDT for the devices listed in the CNT.

The PCI configuration space Device ID along with the Manufacture ID registers are used as a unique identification feature for each chipset component device. Values of these registers are read-only and hold a unique number assigned by the PCI-SIG standards body to the company who produces the PCI devices. The Manufacture ID is not used in the CNT if no distinction between chipset component devices is relevant.

To perform DSDT selection operation 304, the BIOS first gets the number of non-zero records from the CNT at record operation 306. In this example, there are six different non-zero records that specify three different device IDs (0x0530, 0x0500, and 0x0510) with two records for each device ID. This indicates that there are two SPS, two SNC, and two SIOH so the appropriate DSDT must support this hardware configuration. At this time, the location of each device may also be found from the CNT, including the bus number and device number if necessary for subsequent processes such as DSDT updating described below with reference to FIG. 4.

After having determined the number of chipset component devices of each type and the number of device numbers per device ID, the BIOS selects the DSDT that provides the correct configuration of hardware at selection operation 308. The BIOS may make the selection by parsing a header of each DSDT stored by the BIOS where the header specifies a signature that corresponds to the number of devices of each type that are present. Alternatively, the BIOS may make the selection by parsing the contents of the DSDT to maintain a count from the entries of the number of chipset component devices of each type that are present. When a DSDT has been reviewed but is not correct, a pointer to the header of the subsequent DSDT to be considered is retrieved by the BIOS from the current DSDT header so that the next DSDT in sequence can be found and reviewed.

Figure 4:
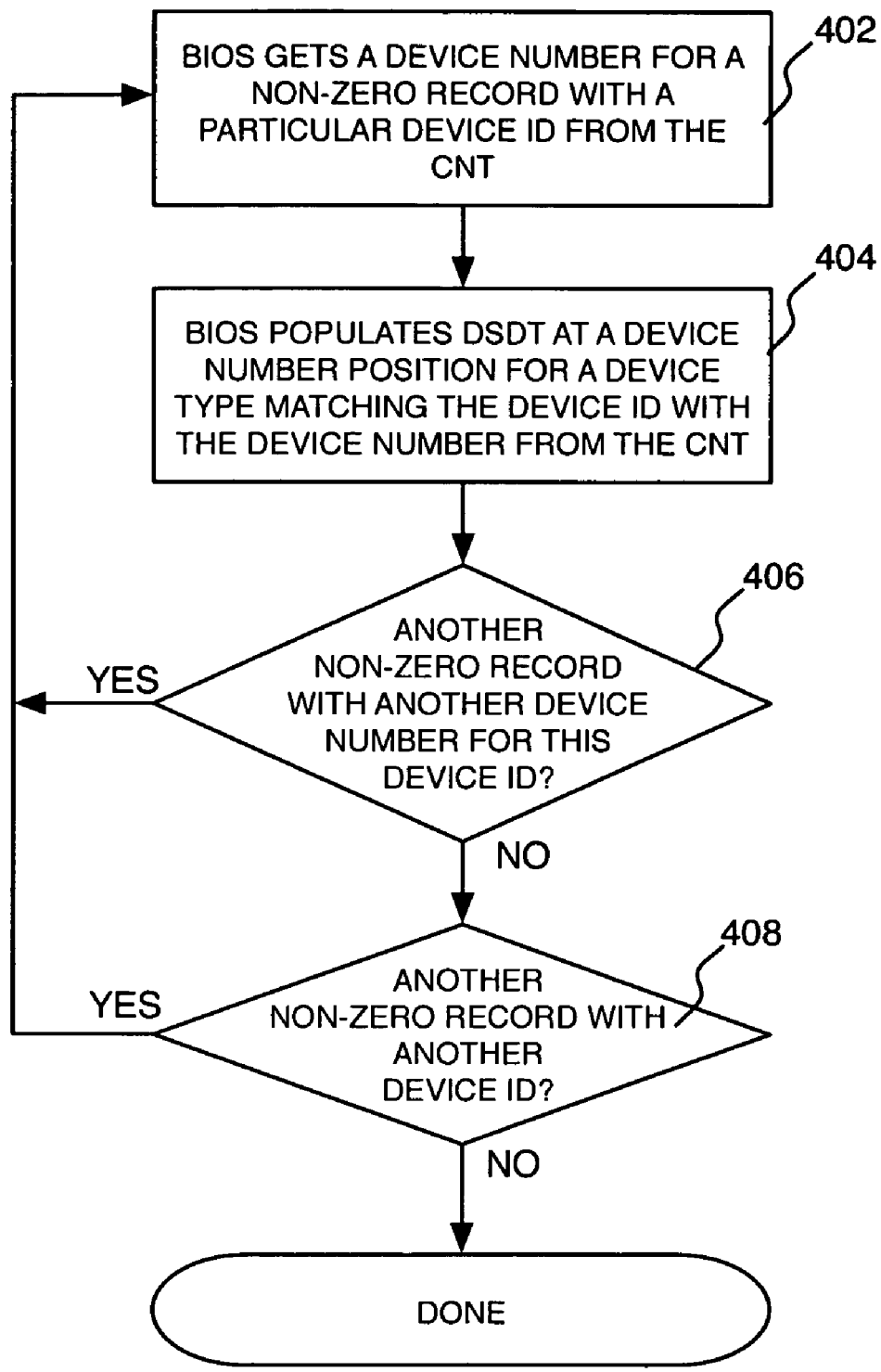
FIG. 4 illustrates the logical operations performed by the BIOS for embodiments where the DSDT table is updated with device configuration information found by the BIOS during boot-up of the computer system.

After having found the DSDT that is appropriate, the BIOS then copies the selected DSDT into the ACPI reclaimable memory and saves a pointer to the memory location of the DSDT in an RSDT at pointer operation 312. If the DSDT in memory needs to have the device number, bus number, and/or function number updated, the operations of FIG. 4 are performed. Then, once the BIOS boots the operating system of the computer, the Operating System scans the RSDT and finds the pointer to the appropriate DSDT. The Operating System may then reference the DSDT to access the hardware devices at the device number and bus number specified in the DSDT.

Although the discussion above refers to creating a CNT that lists the bus number and device number for each instance of the device ID, it will be appreciated that the process of counting the numbers of device IDs and device numbers per device ID may be done without resorting to the creation of a CNT. However, the BIOS may fill the CNT with additional information and may reference the CNT for additional reasons, so the CNT is a convenient tool to also use when selecting a DSDT. Upon selecting the appropriate DSDT, the CNT may be deleted from system memory unless it is to be used for a subsequent process such as DSDT updating discussed below.

The DSDT that is chosen by the BIOS according to the logical operations of FIG. 3 may have device numbers and bus numbers already contained within the file for embodiments where it is known what these values are, such as where they are pre-defined and are static. In this case, the selected DSDT is already available for reference by the operating system. However, where flexible chipsets such as the i870 chipset is employed, device configuration information such as the device number may be user definable. Also, it may be that the bus number becomes user definable as well. As such, these values may change to values that are not known when the DSDT is created for the BIOS. Thus, the DSDT(s) that are created during BIOS manufacturing may be DSDT templates that have placeholder values that must later be filled with real system values.

FIG. 4 shows illustrative logical operations for updating the existing DSDT with device configuration values to account for device configuration information that is generated by the user, which is not available for inclusion in the DSDT during manufacture of the BIOS. As mentioned, the DSDT may be initially created as a template with placeholder values that are written over during boot-up by the logical operations of FIG. 4. It should be noted that the illustrative logical operations of FIG. 4 may apply independently of those of FIG. 3 such that in embodiments where only a single DSDT is stored by the BIOS, the DSDT may be stored with only placeholder values for device configuration information such that this information is later updated into the one DSDT during boot-up. In embodiments where the logical operations of FIG. 3 and FIG. 4 both apply, then the proper DSDT template is chosen by the logical operations of FIG. 3 and then the configuration information is updated into the chosen DSDT by the logical operations of FIG. 4.

The logical operations of FIG. 4 begin at device number operation 402 where the BIOS obtains a non-zero device number value from a non-zero record that is associated with a non-zero device ID value in the CNT. At this point, the BIOS may also obtain additional configuration information values associated with the non-zero device number including the bus number and function number(s). Function numbers are generally pre-defined for devices utilizing the PCI bus and the BIOS may store an association of function numbers to the device. For example, an SNC is known to provide five functions as shown in Table 2 which may already be hard coded into the DSDT.

TABLE 2

Function Numbers of an SNC

| Function Number | Corresponding Function |
|---|---|
| 0000 | CPU control registers |
| 0001 | Scalability Port control registers |
| 0002 | Memory control registers |
| 0003 | Memory Interleave control registers |
| 0004 | Chipset health and performance monitoring control registers |

At DSDT operation 404, the BIOS populates the DSDT stored in memory by writing in the discovered device configuration information in place of the placeholders for a device that has a device type matching the non-zero device ID of the record in the CNT (see Table 3 below where SNC0 in the DSDT is a device type that corresponds to the device ID 0x0500 of the CNT). The discovered device configuration information may include any combination of the device number, its function number(s), and its associated bus number where applicable. An example of a portion of ASL code that when compiled forms a portion of the DSDT that describes chipset registers for an SNC is shown in Table 3. This portion is nested within a portion of the ASL code that lists child devices, such as the SNC, for a particular bus number such as 0x00ff.

TABLE 3

ASL Code Portion Describing SNC

```
//
// SNC0 function 0 - Processor bus control registers
//
Device(SNC0) {
    Name(_ADR, 0x00FF0000)    // device 0x18, function 0
    // CVCR Register only in function 0
    OperationRegion(CVCR, PCL_CONFIG, 0x48, 4)
    Field(CVCR, ANYACC, NOLOCK, PRESERVE) {
        ,28,        // bits 0:27
        CPU0, 1,    // CPU0 state (1 is present)
        CPU1, 1,    // CPU1 state
        CPU2, 1,    // CPU2 state
        CPU3, 1,    // CPU3 state
    } // end op region
} // end SNC0
```

For this description for an SNC present in the system, the SNC device has been discovered to have a device number of 0x18, as indicated in the comment of Table 3 that is provided for purposes of illustration. The entry "Name(_ADR, 0x00FF0000)" in Table 3 specifies that a device having an unknown device number where the high word 0x00ff is an illegal device number acting as a placeholder for the device number to be updated. A hard-coded function number of 0x0000 is the low word. In this example, the device number that is read from the SNC device for this piece of ASL code and that has been put in the CNT is 0x18, so the 0x18 value is the update for the entry which becomes "Name(_ADR, 0x00180000)" to identify device 0x0018 with function 0x0000. Also, in this example, the bus number is specified by the parent device for which this piece of ASL code of Table 3 is nested. It will be appreciated that in other examples the function number and bus number may also be unknowns that are updated with the device number.

Once the placeholders for the device configuration information has been updated with the associated values found in the CNT and/or device function tables of the BIOS, then operational flow transitions to query operation 406. At query operation 406, the BIOS detects from the CNT or DSDT whether another non-zero record with another non-zero device number is available for the current device ID. If so, the operational flow returns to device number operation 402 where the device number of the next non-zero record for the current device ID is used to update the device number, corresponding function number(s), and/or the bus number where applicable. Once all non-zero records for a particular device ID have been handled, then operational flow transitions to query operation 408.

At query operation 408, the BIOS detects from the CNT or DSDT whether another non-zero record for another device ID is available for the hardware configuration. If so, the operational flow returns to device number operation 402 where a device number of a non-zero record for the next device ID from the CNT is used to update the device number, corresponding function number(s), and possibly the bus number. Once all non-zero records with device numbers for this next device ID have been handled, then operational flow returns to query operation 408 to check for another device ID of another non-zero record. Once all device IDs have been handled, the process ends and the CNT can be deleted from system memory. The DSDT table has now been updated with the device configuration information that the operating system can access to utilize the hardware of the computer system.

While the invention has been particularly shown and described with reference to illustrative embodiments thereof, it will be understood by those skilled in the art that various other changes in the form and details may be made therein without departing from the spirit and scope of the invention.

What is claimed is:

1. A method of updating a Differentiated System Description Table (DSDT) of a computer Basic Input and Output System (BIOS), comprising:
    detecting a set of devices of the computer;
    for each device within the detected set, determining device configuration information from querying a store of the device;
    for each device, finding a corresponding entry within the DSDT; and
    for each device, writing the determined device configuration information into the corresponding entry.

2. The method of claim 1, wherein the set of devices comprise scalability node controllers.

3. The method of claim 1, wherein the set of devices comprise scalability port switches.

4. The method of claim 1, wherein the set of devices comprise input and output hubs.

5. The method of claim 1, wherein detecting a set of devices of the computer comprises reading available chipset registers.

6. The method of claim 1, wherein determining device configuration information from querying a store of the device comprises reading from a read only memory of the device.

7. The method of claim 1, wherein finding a corresponding entry within the DSDT comprises finding an entry that corresponds to a device identifier (ID) of the device configuration information.

8. The method of claim 1, wherein writing the determined device configuration information into the corresponding entry comprises writing in a device number into the entry of the DSDT.

9. The method of claim 1, wherein writing the determined device configuration information into the corresponding entry comprises writing in a function number into the entry of the DSDT.

10. A method for updating a Differentiated System Description Table (DSDT) of a computer Basic Input and Output System (BIOS), comprising:
   upon a first boot-up, analyzing hardware of the computer system to find device configuration information;
   updating the DSDT with the device configuration information;
   altering the device configuration information of the computer system;
   upon a re-start after altering the device configuration information, analyzing the hardware of the computer system to find the altered device configuration information; and
   updating the DSDT with the altered device configuration information.

11. The method of claim 10, wherein updating the DSDT comprises finding a corresponding entry within the DSDT table that sets forth a device ID matching a device identifier (ID) of the device configuration information.

12. The method of claim 10, wherein updating the DSDT comprises writing a device number into a corresponding entry of the DSDT.

13. The method of claim 10, wherein updating the DSDT comprises writing a function number into a corresponding entry of the DSDT.

14. A computer system, comprising:
   a memory storing a Differentiated System Description Table (DSDT);
   a set of devices; and
   a Basic Input and Output System (BIOS) configured to:
   detect the set of devices of the computer;
   for each device within the detected set, determine device configuration information from querying a store of the device;
   for each device, finding a corresponding entry within the DSDT; and
   for each device, writing the determined device configuration information into the corresponding entry.

15. The computer system of claim 14, wherein the BIOS is configured to detect a set of devices of the computer by reading available chipset registers.

16. The method of claim 14, wherein the BIOS is configured to determine device configuration information by reading from a read only memory of the device.

17. The method of claim 14, wherein the BIOS is configured to find a corresponding entry within the DSDT table by finding an entry that corresponds to a device identifier (ID) of the device configuration information.

18. The method of claim 14, wherein the BIOS is configured to write the determined device configuration information into the corresponding entry by writing in a device number into the entry of the DSDT.

19. The method of claim 14, wherein the BIOS is configured to write the determined device configuration information into the corresponding entry by writing in a function number into the entry of the DSDT.

20. A computer system, comprising:
   a memory storing a Differentiated System Description Table (DSDT);
   a set of devices; and
   a Basic Input and Output System (BIOS) configured to:
   upon a first boot-up, analyze hardware of the computer system to find device configuration information;
   update the DSDT with the device configuration information;
   upon a re-start after the device configuration information has been altered, analyze the hardware of the computer system to find the altered device configuration information; and
   update the DSDT with the altered device configuration information.

21. The computer system of claim 20, wherein the BIOS updates the DSDT by finding a corresponding entry within the DSDT table that corresponds to a device identifier (ID) of the device configuration information.

22. The method of claim 20, wherein the BIOS updates the DSDT by writing a device number into a corresponding entry of the DSDT.

23. The method of claim 20, wherein the BIOS updates the DSDT by writing a function number into a corresponding entry of the DSDT.

24. A method of updating a Differentiated System Description Table (DSDT) of a computer Basic Input and Output System (BIOS) where multiple DSDTs are available, the method comprising:
   detecting a set of devices of the computer;
   for each device within the detected set, determining device configuration information from querying a store of the device;
   for each device, finding a corresponding entry within the DSDT;
   for each device, writing the determined device configuration information into the corresponding entry; and
   selecting an appropriate DSDT from the multiple DSDTs based on the set of detected devices, and wherein the corresponding entry is found within the selected DSDT and the device configuration is written into the selected DSDT.

25. The method of claim 24, wherein the set of devices comprise scalability node controllers.

26. The method of claim 24, wherein the set of devices comprise scalability port switches.

27. The method of claim 24, wherein the set of devices comprise input and output hubs.

28. The method of claim 24, wherein detecting a set of devices of the computer comprises reading available chipset registers.

29. The method of claim 24, wherein determining device configuration information from querying a store of the device comprises reading from a read only memory of the device.

30. The method of claim 24, wherein finding a corresponding entry within the DSDT comprises finding an entry that corresponds to a device identifier (ID) of the device configuration information.

31. The method of claim 24, wherein writing the determined device configuration information into the corresponding entry comprises writing in a device number into the entry of the DSDT.

32. The method of claim 24, wherein writing the determined device configuration information into the corresponding entry comprises writing in a function number into the entry of the DSDT.

33. A computer-readable medium having computer-executable instructions stored thereon which, when executed by a computer, cause the computer to perform the method of claim 24.

34. A computer system for performing the method of claim 24.

* * * * *